US010360519B2

(12) United States Patent
Mu et al.

(10) Patent No.: US 10,360,519 B2
(45) Date of Patent: Jul. 23, 2019

(54) PLANNING METHOD OF ELECTRIC VEHICLE FAST CHARGING STATIONS ON THE EXPRESSWAY

(71) Applicant: Tianjin University, Tianjin (CN)

(72) Inventors: Yunfei Mu, Tianjin (CN); Xiaohong Dong, Tianjin (CN); Hongjie Jia, Tianjin (CN); Xiaodan Yu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/747,549

(22) PCT Filed: Aug. 28, 2015

(86) PCT No.: PCT/CN2015/088388
§ 371 (c)(1),
(2) Date: Jan. 25, 2018

(87) PCT Pub. No.: WO2017/028333
PCT Pub. Date: Feb. 23, 2017

(65) Prior Publication Data
US 2018/0240047 A1    Aug. 23, 2018

(30) Foreign Application Priority Data
Aug. 19, 2015 (CN) .......................... 2015 1 0515806

(51) Int. Cl.
*H02J 7/00* (2006.01)
*G06Q 10/04* (2012.01)
*B60L 53/10* (2019.01)

(52) U.S. Cl.
CPC .............. *G06Q 10/04* (2013.01); *B60L 53/11* (2019.02)

(58) Field of Classification Search
CPC .................................................. Y02T 90/14
(Continued)

(56) References Cited

U.S. PATENT DOCUMENTS 5,548,200 A * 8/1996 Nor ........................ B60L 11/184
320/106
5,986,430 A * 11/1999 Fernandez ............ H02J 7/0004
320/106
(Continued)

FOREIGN PATENT DOCUMENTS

CN    102521488 A    6/2012
CN    102880921 A    1/2013
(Continued)

OTHER PUBLICATIONS

*Automation of Electric Power Systems*, vol. 38, No. 2, CN, Jan. 25, 2014, Qian, Bin et al., pp. 64-69.

*Primary Examiner* — Yalkew Fantu
(74) *Attorney, Agent, or Firm* — George G. Wang; Bei & Ocean (57) ABSTRACT

A planning method of EV fast charging stations on the expressway, comprising the following steps: Step 1: forecasting the spatial and temporal distribution of EV charging load, that is to determine the time and location of each EV needing charging on the expressway; Step 2: based on the forecast result achieved by Step 1, determining the locations of the fast charging stations on the expressway by the nearest neighbor clustering algorithm; Step 3: according to the spatial and temporal forecast result of the EV charging load and the locations of the fast charging stations, determining the number c of the chargers in each fast charging station by queuing theory. Due to battery characteristics, traditional gas stations do not completely match the fast charging stations. In the planning method, the locations and times for charging of the EVs are considered to determine the capacities and locations of the fast charging stations, which can meet the charging needs of the EVs more than the traditional gas station, and thus promote the development of EVs.

4 Claims, 5 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2003/0120442 A1* | 6/2003 | Pellegrino | B60L 11/1816 |
| | | | 702/60 |
| 2010/0079004 A1 | 4/2010 | Keefe | |
| 2013/0221918 A1* | 8/2013 | Hill | H02J 7/34 |
| | | | 320/109 |
| 2013/0307475 A1* | 11/2013 | Kishiyama | H02J 7/0027 |
| | | | 320/109 |
| 2014/0062397 A1* | 3/2014 | Dyer | B60L 1/003 |
| | | | 320/109 |
| 2014/0121866 A1* | 5/2014 | Dangler | H02J 7/0029 |
| | | | 701/22 |

FOREIGN PATENT DOCUMENTS

| | | |
|---|---|---|
| CN | 103295074 A | 9/2013 |
| CN | 104077635 A | 10/2014 |
| CN | 104182595 A | 12/2014 |
| CN | 102722767 A | 1/2015 |
| CN | 104318357 A | 1/2015 |

* cited by examiner

PLANNING METHOD OF ELECTRIC VEHICLE FAST CHARGING STATIONS ON THE EXPRESSWAY

FIELD OF INVENTION

The invention belongs to the technical field of the planning method of electric vehicle (hereinafter referred to as EV) fast charging stations, in particular to a planning method for determining the locations and capacities of the EV fast charging stations on the expressway based on the traffic network characteristics, the EV characteristics, the users' travel behaviors and other information.

BACKGROUND OF THE PRESENT INVENTION

So far the researches of charging station planning are relatively preliminary, and there is no complete and systematic charging station planning model and method. According to the existing researches about location siting and capacity sizing, the number of charging stations is roughly estimated based on the EV maximum travel range of EVs and traffic network or the traffic flow under most circumstances. But the EV fast charging station and the gas station may not be exactly same due to the EV characteristics.

SUMMARY OF THE PRESENT INVENTION

Considering the inadequacies in the existing technology, such as EV's characteristics and uncertainty of traffic behavior, a planning method for fast charging stations on the expressway is provided to solve the problem of the location siting and capacity sizing of the fast charging stations on the expressway, so as to provide charging services for more EV users with the minimum total cost of the charging station infrastructure cost and user waiting cost.

In order to solve the technical problems mentioned above, the present invention provides a planning method of EV fast charging stations on the expressway, comprising forecasting the spatial and temporal distribution of EV charging load, determining the locations of the EV fast charging stations and determining the number of the chargers in each fast charging station. The detailed steps of the planning method are as follows:

Step 1: forecasting the spatial and temporal distribution of EV charging load, that is to determine the time and location of each EV needing charging on the expressway;

Step 2: Based on the forecast result achieved by step 1, determining the locations of the fast charging stations on the expressway by the nearest neighbor clustering algorithm, which further includes the following steps:

Step 2-1: Calculating the maximum travel range $Ran_{sc}$ after the EVs need charging; based on the central limit theorem, determining the travel distance of 99% EVs under the remaining capacity of batteries by fitted normal distribution, wherein the travel distance is defined as the service radius SR of the fast charging stations;

Step 2-2: Determining the distance matrix D, where $d_{ij}$ represents the distance between the EV location needing charging $P_i$ to the EV location needing charging $P_j$, i and j belongs to 1~n, and n represents the total number of the EVs needing charging;

Step 2-3: Determining the similarity matrix S; based on the distance matrix D, determining the number of the EV locations needing charging within the service radius SR of each EV location needing charging; the similarity $s_{ij}$ of the EV location needing charging $P_i$ and the EV location needing charging $P_j$ is defined in the equation (5);

$$s_{ij}=\text{size}(NN(i) \cap NN(j)) \quad (5)$$

Wherein, NN(i) and NN(j) are the sets of the EV locations needing charging within the service radius SR of the EV location needing charging $P_i$ and $P_j$, respectively; the "size" means the shared number of the EV locations needing charging in the intersection set of NN(i) and NN(j);

Step 2-4: Calculating the EV charging demand $l_{1,j}$ of each location needing charging according to the sum of the rows of the similarity matrix S by the following equation;

$$l_{1,j} = \sum_{i}^{n} s_{ij} (1 \le j \le n) \quad (6)$$

Step 2-5: Determining the locations of the fast charging stations; sorting the charging demands from large to small to obtain a charging demand sequence, and taking the location needing charging corresponding to the maximum charge demand as the first cluster center, namely the candidate fast charging station 1; meanwhile, obtaining the EV location needing charging set C(1) within the service radius SR of the candidate fast charging station 1, and storing location of the candidate fast charging station 1 and the set C(1) in the fast charging station set CS;

Selecting the next EV location needing charging based on the charging demand sequence in turn; if the similarity of the location and the candidate fast charging station in the fast charging station set CS are both equal to 0, taking the location needing charging as the candidate fast charging station 2; meanwhile, obtaining the EV location needing charging set C(2) within the service radius SR of the candidate fast charging station 2, and storing the location of the candidate fast charging station 2 and the set C(2) in the fast charging station set CS; And so on in a similar way, determining the location of all candidate fast charging stations;

Removing the locations of the candidate fast charging stations and the sets thereof within the corresponding service radius SR from the set CS, if the location number of the EV locations needing charging set of the candidate fast charging station is less than the preset threshold d; and determining the remaining candidate fast charging stations in the CS as the fast charging station;

Step 3: According to the spatial and temporal forecast result of the EV charging load and the location of the fast charging station, determining the number of the chargers in each fast charging station by queuing theory.

Furthermore, the Step 1 further includes the following steps:

Step 1-1: obtaining the following basic data;

EV data: including the EV types, the probability density function of battery capacity for each EV type, the upper and lower boundary of the battery capacity for each EV type and the mathematical relationship between battery capacity and EV maximum travel range thereof;

Traffic data: including the probability matrix $P_{m \times m}$ of traffic origin and destination point and the probability distribution of the time $t_s$ when the car entered the expressway;

Obtaining the traffic origin-destination matrix $A_{m \times m}$ of the expressway entrance & exit through the investigation data of traffic origin and destination points, and obtaining the matrix $P_{m \times m}$ according to the equation (1) by using the matrix $A_{m \times m}$;

$$p_{ij}=a_{ij}/B_i (1 \le i \le m, 1 \le j \le m) \quad (1)$$

In the equation (1), m is the number of the expressway entrance & exit; $a_{ij}$ is the daily average EV number passing through the expressway entrance & exit i to the expressway entrance & exit j; $p_{ij}$ is the daily probability of a vehicle passing through the expressway entrance & exit i to the expressway entrance & exit j, $B_i$ is the daily average vehicle number entering the expressway via the expressway entrance & exit i;

$$B_i = \sum_{j=1}^{m} a_{ij} (1 \leq i \leq m, 1 \leq j \leq m) \qquad (2)$$

Wherein the expressway basic information includes the number of the expressway entrance & exits, the expressway entrance & exit number, the expressway entrance & exit coordinates, the distance between the entrance & exits;

Step 1-2: determining the following data:

Determining the proportion of different EV types, the daily average EV number $EB_t$ entering the expressway and the daily average EV number $EB_i$ entering the expressway from the entrance & exit i;

According to the number $EB_t$ and the number $EB_i$, assigning numbers to the EVs according to the order of EVs entering into the expressway entrance & exit;

Step 1-3: Determining the spatial and temporal distribution of the charging load for all EVs entering the expressway; setting i=1;

Step 1-3-1: Determining the $i^{th}$ EV parameters, including the EV type, the maximum capacity Cap, the initial state of charging $SOC_i$, the battery state $SOC_c$ when the EV needs charging, the travel range $Ran_{ac}$ before the $i^{th}$ EV charges, the maximum travel range $Ran_{sc}$ after the EV needs charging; The detail steps are following:

Determining the $i^{th}$ EV type by the Monte Carlo method;

According the EV type of the $i^{th}$ EV and the probability density function of the battery capacity thereof, determining the maximum capacity Cap of the $i^{th}$ EV by the Monte Carlo method; And setting the state $SOC_i$ and the state $SOC_c$ of the $i^{th}$ EV;

According the EV type, maximum capacity Cap and the mathematical relationship between battery capacity and EV maximum travel range thereof for the $i^{th}$ EV, determining the maximum travel range $Ran_{mc}$ of the $i^{th}$ EV by the Monte Carlo method; and according to the state $SOC_i$, $SOC_c$ and travel range $Ran_{mc}$, determining the $Ran_{ac}$ of the $i^{th}$ EV by the equation (3); and determining the Ran of the $i^{th}$ EV by the equation (4);

$$Ran_{ac} = \eta \times (SOC_i - SOC_c) \times Ran_{mc} \qquad (3)$$

$$Ran_{sc} = \eta \times SOC_c \times Ran_{mc} \qquad (4)$$

In the equations (3) and (4), the is an energy efficiency coefficient of the battery;

Step 1-3-2: Determining the traffic parameters of the $i^{th}$ EV, including the start point, destination, the travel path, the time $Et_s$ entering the expressway, the travel distance $D_{od}$; determining the start point according to the $i^{th}$ EV number; determining the destination according to the start point of the $i^{th}$ EV and the traffic origin-destination matrix $P_{m \times m}$ by the Monte Carlo method; determining the travel path based on the shortest path algorithm; obtaining the $D_{od}$ based on the expressway basic information; and determining the $Et_s$ by the Monte Carlo method based on the probability distribution of the time $t_s$ when the vehicle entered into the expressway; and setting the travel velocity v;

Step 1-3-3: determining whether the travel distance $D_{od}$ of the $i^{th}$ EV is larger than the $Ran_{ac}$;

If $D_{od} > Ran_{ac}$, the $i^{th}$ EV needing charging and performing the Step 1-3-4; otherwise, no charging the $i^{th}$ EV, and performing i=i+1;

If i<$EB_t$, going back to the step 1-3-1; otherwise, performing Step 2;

Step 1-3-4: Determining the time and location when the $i^{th}$ EV needs charging; determining the location $P_i$ and time $t_c$ of the $i^{th}$ EV needing charging according to the start point, travel path, v, $Ran_{ac}$ and the $Et_s$ of the $i^{th}$ EV, and i=i+1; if i<$EB_t$, going back to the step 1-3-1; otherwise, performing Step 2.

Step 3 further includes the following steps:

Step 3-1: determining the peak value of EVs arrived at each fast charging station per hour by using the time of each EV needing charging achieved by the Step 1 and the locations of the fast charging stations achieved by the Step 2; setting the peak value as the number $\lambda$, of reaching the fast charging station per hour for EVs;

Step 3-2: Determining the chargers' number of each fast charging station c;

Calculating the average length $L_s$ of waiting queue and the waiting time $W_q$ by the following equations:

$$L_s = L_q + \frac{\lambda}{\mu_2} = \frac{(c\rho)^c \rho}{c!(1-\rho)^2} P_0 + \frac{\lambda}{\mu_2} \qquad (7)$$

$$P_0 = \left[ \sum_{k=0}^{c-1} \frac{1}{k!}\left(\frac{\lambda}{\mu_2}\right)^k + \frac{1}{c!}\frac{1}{1-\rho}\left(\frac{\lambda}{\mu_2}\right)^c \right]^{-1} \qquad (8)$$

$$\rho = \lambda / (c \times \mu_2) \qquad (9)$$

$$W_q = \frac{L_q}{\lambda} \qquad (10)$$

Wherein, $\mu_2$ represents the average charged EVs number of a charger per hour; c represents the chargers' number of the fast charging station; the following equation (11) is used as the objective function, and the following equation (12) is used as the constraint condition for solving the optimization, and the chargers' number c can be obtained;

$$\min z = C_s c + C_w L_s \qquad (11)$$

$$s.t. \ W_q < t_w \qquad (12)$$

In the equations (11) and (12), $C_s$ is the cost per hour, expressed in RMB yuan, converted from per charger by the following equation (13); $C_w$ is travel cost per hour, expressed in RMB yuan/vehicle; $t_w$ is the maximum waiting time, expressed in minute.

$$C_s = V_0 \frac{i_r(1+i_r)^P}{(1+i_r)^P - 1} \bigg/ 8760 \qquad (13)$$

Wherein, $V_0$ is the charger cost in whole life cycle; $i_r$ is interest rate; p is the charger's service life.

Compared with the existing prior art, the beneficial effects of the present invention is that:

Due to battery characteristics, traditional gas stations do not completely match the fast charging stations. In the planning method, the location and time for charging of the EVs are considered to determine the capacity and location of the fast charging stations, which can meet the charging needs of the EVs more than the traditional gas station, and thus promote the development of EVs.

DETAILED DESCRIPTION OF THE PRESENT INVENTION

Figure 1:
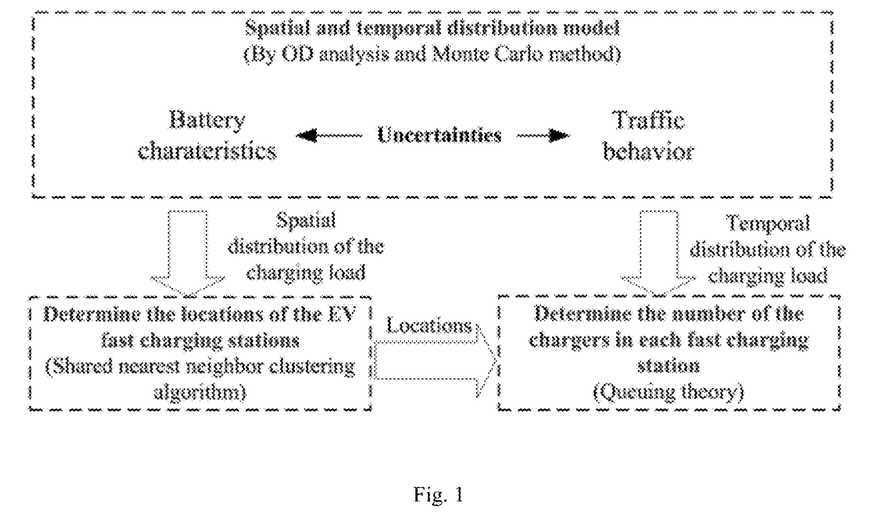
FIG. 1 is the flow chart of the planning method of the present invention.
Figure 2:
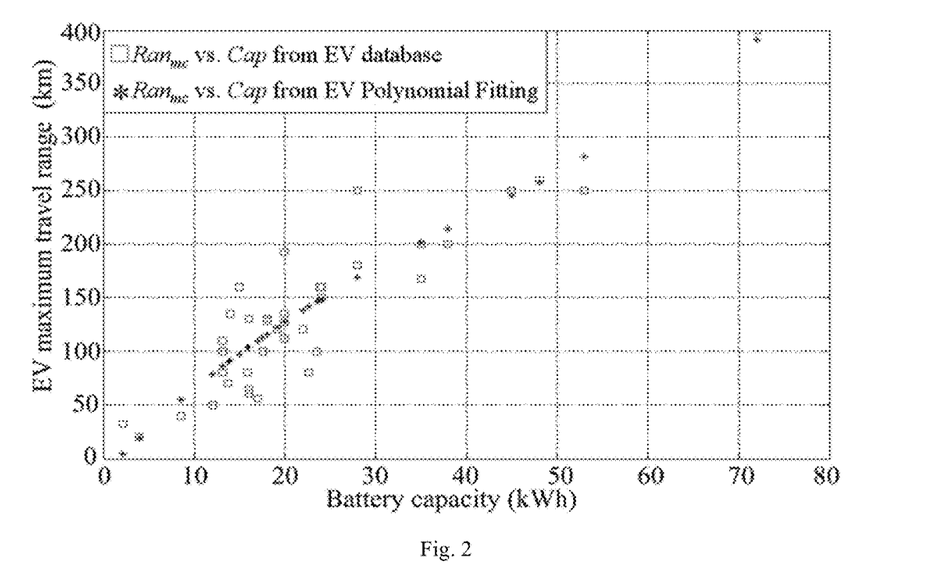
FIG. 2 is the polynomial fitting of the battery capacity and its EV maximum travel range of M1 type by original data in the simulation example.

The present invention is further explained by a preferred embodiment as follows:

An EV Fast charging station planning method on the expressway is provided by the present invention. The flow chart of the planning method is shown in the FIG. 1, which mainly includes forecasting the temporal and spatial distribution of EV charging load, determining the locations of the EV fast charging stations and determining the number of the chargers in each fast charging station. The detail steps are as follows:

Step 1: forecasting the spatial and temporal distribution of EV charging load, that is to determine the time and location of each EV needing charging on the expressway;

Step 1-1: obtaining the following basic data;

EV data: including the EV types, the probability density function of battery capacity for each EV type, the upper and lower boundary of the battery capacity for each EV type and the mathematical relationship between battery capacity and EV maximum travel range thereof. According to the statistical analysis of European Union EV database, EVs in the simulation example are divided into four types: Quadricycle-four wheels wagon (L7e) with a load ranging from 400 kg to 550 kg, Passenger vehicle (M1), four wheels up to 8 seats, four-wheel goods-carrying vehicle (N1), with a maximum laden mass of 3500 kg, four-wheel goods-carrying vehicle (N2), with a maximum laden mass between 3500 kg and 12,000 kg. The function relation between the battery capacity and its EV maximum travel range for each EV type is obtained based on the above database. Wherein, the polynomial fitting of the battery capacity and its EV maximum travel range of M1 type by original data is shown in the FIG. 2;

Traffic data: including the probability matrix $P_{m \times m}$ of traffic origin and destination point and the probability distribution of the time $t_s$ when the car entered the expressway;

Obtaining the traffic origin-destination matrix $A_{m \times m}$ of the entrance & exit through the investigation data of traffic origin and destination points, and obtaining the matrix $P_{m \times m}$ according to the equation (1) by using the matrix $A_{m \times m}$;

$$p_{ij} = a_{ij}/B_i (1 \le i \le m, 1 \le j \le m) \quad (1)$$

Wherein, m is the number of the expressway entrance & exit; $a_{ij}$ is the daily average EV number passing through the expressway entrance & exit i to the expressway entrance & exit j; $p_{ij}$ is the daily probability of a vehicle passing through the expressway entrance & exit i to the entrance & exit j, $B_i$ is the daily average vehicle number entering the expressway via the expressway entrance & exit i;

$$B_i = \sum_{j=1}^{m} a_{ij} (1 \le i \le m, 1 \le j \le m) \quad (2)$$

Figure 3:
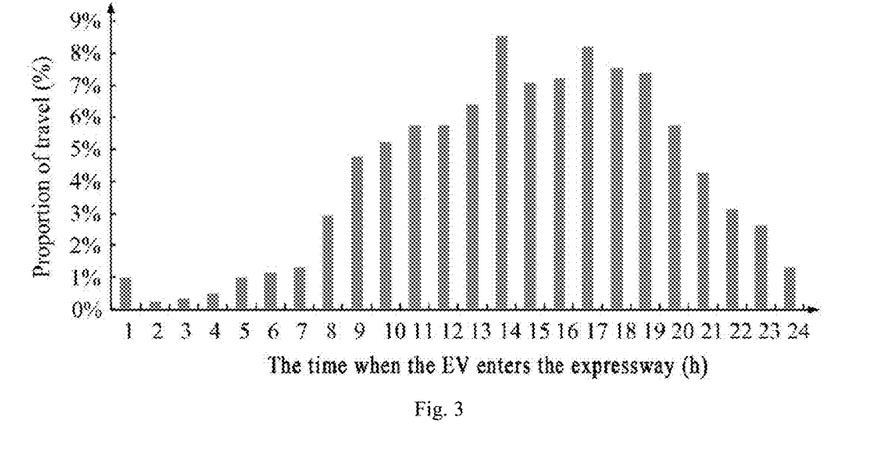
FIG. 3 is the probability distribution of the time $t_s$ when the car entered the expressway.

The probability distribution of the $t_s$ in the simulation example is shown in the FIG. 3.

The expressway basic information: including the number of the expressway entrance & exits, the expressway entrance & exit number, the expressway entrance & exit coordinates, the distance between the expressway entrance & exits, the expressway information is shown in the Table 1.

TABLE 1

The information about expressway entrance & exits of the round expressway

| No. | The distance from the entrance & exit 1 (km) | Coordinate (x, y) |
|---|---|---|
| 1 | 0 | (213, 184) |
| 2 | 9 | (214, 177) |
| 3 | 18 | (214, 169) |
| 4 | 28 | (214, 160) |
| 5 | 41 | (217, 149) |
| 6 | 56 | (222, 138) |
| 7 | 78 | (215, 112) |
| 8 | 84 | (215, 109) |
| 9 | 94 | (225, 106) |
| 10 | 105 | (226, 98) |
| 11 | 115 | (224, 89) |
| 12 | 132 | (217, 76) |
| 13 | 137 | (214, 73) |
| 14 | 148 | (208, 66) |
| 15 | 155 | (205, 61) |
| 16 | 162 | (200, 56) |
| 17 | 169 | (198, 53) |
| 18 | 186 | (194, 51) |
| 19 | 195 | (184, 47) |
| 20 | 208 | (168, 38) |
| 21 | 215 | (161, 36) |
| 22 | 221 | (156, 33) |
| 23 | 229 | (146, 27) |
| 24 | 237 | (213, 184) |
| 25 | 269 | (137, 26) |
| 26 | 279 | (119, 26) |
| 27 | 287 | (111, 27) |
| 28 | 302 | (105, 27) |
| 29 | 317 | (93, 33) |
| 30 | 328 | (83, 41) |
| 31 | 339 | (67, 52) |
| 32 | 351 | (63, 61) |
| 33 | 365 | (62, 72) |
| 34 | 384 | (60, 89) |
| 35 | 402 | (63, 103) |
| 36 | 427 | (79, 116) |
| 37 | 439 | (87, 124) |
| 38 | 449 | (91, 131) |
| 39 | 460 | (95, 141) |
| 40 | 492 | (110, 156) |
| 41 | 508 | (129, 164) |
| 42 | 523 | (140, 169) |
| 43 | 538 | (151, 175) |

TABLE 1-continued

The information about expressway entrance
& exits of the round expressway

| No. | The distance from the entrance & exit 1 (km) | Coordinate (x, y) |
|---|---|---|
| 44 | 551 | (161, 178) |
| 45 | 563 | (173, 179) |
| 46 | 577 | (180, 180) |
| 47 | 587 | (184, 181) |
| Total | 612 | (193, 184) |

Step 1-2: determining the following data:

Determining the proportion of different EV types, the daily average EV number $EB_t$ entering the expressway and the daily average EV number $EB_i$ entering the expressway from the entrance & exit i;

The proportions of the EV types (that is L7e, M1, N1 and N2) set in the simulation example are 10%, 84%, 3% and 3%, respectively; The daily average EV number $EB_t$ entering the expressway is 17297 vehicles. The daily average EV number $EB_i$ entering the expressway from the entrance & exit i can be obtained based on the $EB_t$, $B_t$ and $A_{m \times m}$.

Figure 4:
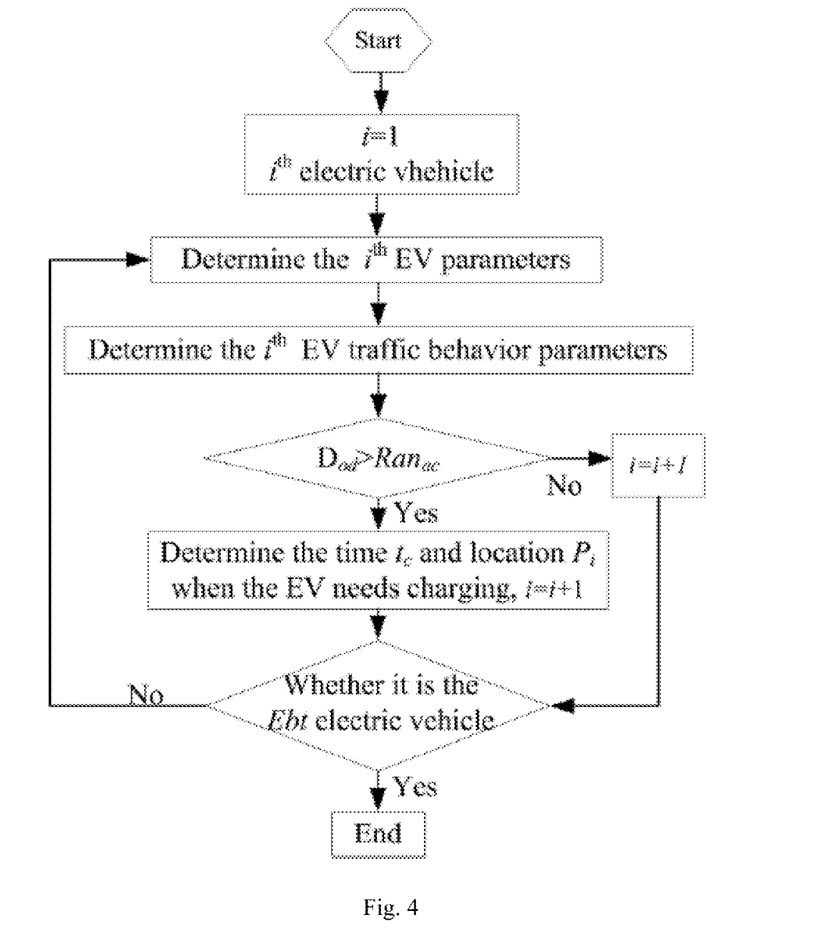
FIG. 4 is the flow chart of the temporal and spatial distribution forecast of the EV charging load in the present invention.

According to the number $EB_t$ and the number $EB_i$, assigning numbers to the EVs according to the order of EVs entering into the expressway entrance & exit;

Step 1-3: Determining the spatial and temporal distribution of the charging load for all EVs entering the expressway as shown in the FIG. 4; setting i=1;

Step 1-3-1: Determining the $i^{th}$ EV parameters, including the EV type, the maximum capacity Cap, the initial state of charging SOC the battery state $SOC_c$ when the EV needs charging, the travel range $Ran_{ac}$ before the $i^{th}$ EV charges, the maximum travel range $Ran_{sc}$ after the EV needs charging. The detail steps are following:

Determining the start point based on the $i^{th}$ EV number and determining the $i^{th}$ EV type by the Monte Carlo method;

According the EV type of the $i^{th}$ EV and the probability density function of the battery capacity thereof, determining the maximum capacity Cap of the $i^{th}$ EV by the Monte Carlo method, and setting the state $SOC_i$ and the state $SOC_c$ of the $i^{th}$ EV; The value of state $SOC_i$ is 0.8, and the value of state $SOC_c$ ranges from 0.15 to 0.3 in the simulation example;

According the EV type, maximum capacity Cap and the mathematical relationship between battery capacity and EV maximum travel range thereof for the $i^{th}$ EV, determining the maximum travel range $Ran_{mc}$ of the $i^{th}$ EV by the Monte Carlo method; and according to the values of state $SOC_i$, $SOC_c$ and travel range $Ran_{mc}$, determining the $Ran_{ac}$ of the $i^{th}$ EV by the equation (3); and determining the $Ran_{sc}$ of the $i^{th}$ EV by the equation (4);

$$Ran_{ac} = \eta \times (SOC_i - SOC_c) \times Ran_{mc} \qquad (3)$$

$$Ran_{sc} = \eta \times SOC_c \times Ran_{mc} \qquad (4)$$

Figure 5:
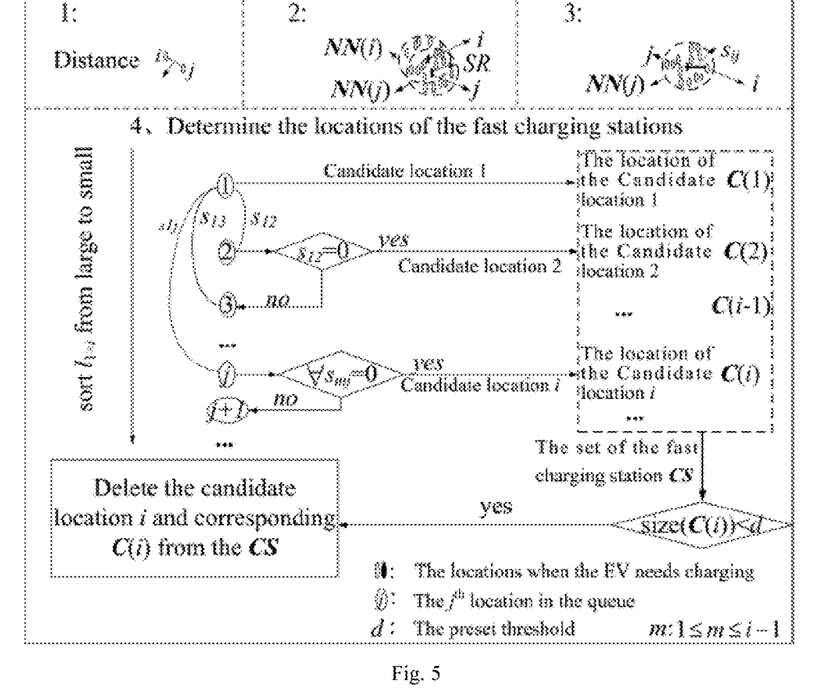
FIG. 5 is the diagram of the shared nearest neighbor clustering algorithm.

In the equations (3) and (4), the $\eta$ is an energy efficiency coefficient of the battery, $\eta$ takes 1 in the simulation example;

Step 1-3-2: Determining the traffic parameters of the $i^{th}$ EV (as shown in FIG. 1), including the start point, destination, the travel path, the time $Et_s$ entering the expressway, the travel distance $D_{od}$; determining the start point according to the $i^{th}$ EV number; determining the destination according to the start point of the $i^{th}$ EV and the traffic origin-destination matrix $P_{m \times m}$ by the Monte Carlo method; determining the travel path based on the shortest path algorithm; obtaining the $D_{od}$ based on the expressway basic information; and determining the $Et_s$ by the Monte Carlo method based on the probability distribution of the time $t_s$ when the vehicle entered into the expressway; and setting the travel velocity v, and v takes 90 km/h in the simulation example;

Step 1-3-3: determining whether the travel distance $D_{od}$ of the $i^{th}$ EV is larger than the $Ran_{ac}$;

If $D_{od} > Ran_{ac}$, the $i^{th}$ EV needing charging and performing the Step 1-3-4; otherwise, no charging the $i^{th}$ EV, and performing i=i+1;

If i<$EB_t$, going back to the step 1-3-1; otherwise, performing Step 2;

Step 1-3-4: Determining the time and location when the $i^{th}$ EV needs charging; determining the location $P_i$ and time $t_c$ of the $i^{th}$ EV needing charging according to the start point, travel path, v, $Ran_{ac}$ and the $Et_s$ of the $i^{th}$ EV, and i=i+1; if i<$EB_t$, go back to the step 1-3-1; otherwise, performs Step 2;

Step 2: Based on the forecast result achieved by step 1, determining the locations of the fast charging stations on the expressway by the nearest neighbor clustering algorithm as shown in the FIG. 5, which further includes the following steps:

Step 2-1: Calculating the maximum travel range $Ran_{sc}$ of all EVs after the EVs need charging; based on the central limit theorem, determining the travel distance of 99% EVs under the remaining capacity of batteries by fitted normal distribution, wherein the travel distance is defined as the service radius SR of the fast charging stations;

Step 2-2: Determining the distance matrix D, where $d_{ij}$ represents the distance between the EV location needing charging $P_i$ to the EV location needing charging $P_j$, i and j belongs to 1~n and n represents the total number of the EVs needing charging;

Step 2-3: Determining the similarity matrix S; based on the distance matrix D, determining the number of the EV locations needing charging within the service radius SR of each EV location needing charging; the similarity $s_{ij}$ of the EV location needing charging $P_i$ and the EV location needing charging $P_j$ is defined in the equation (5);

$$s_{ij} = size(NN(i) \cap NN(j)) \qquad (5)$$

Wherein, NN(i) and NN(j) are the sets of the EV locations needing charging within the service radius SR of the EV locations needing charging $P_i$ and the location $P_j$, respectively; the "size" means the shared number of the EV locations needing charging in the intersection set of NN(i) and NN(j);

Step 2-4: Calculating the EV charging demand $l_{1,j}$ of each location needing charging according to the sum of the rows of the similarity matrix S by the following equation;

$$l_{1,j} = \sum_{i}^{n} s_{ij} (1 \leq j \leq n) \qquad (6)$$

Step 2-5: Determining the locations of the fast charging stations; sorting the charging demands from large to small to obtain a charging demand sequence, and taking the location needing charging corresponding to the maximum charge demand as the first cluster center, namely the candidate fast charging station 1; meanwhile, obtaining the EV location needing charging set C(1) within the service radius SR of the candidate fast charging station 1, and storing location of the candidate fast charging station 1 and the set C(1) in the fast charging station set CS;

Selecting the next EV location needing charging based on the charging demand sequence in turn; if the similarity of the location and the candidate fast charging station in the fast charging station set CS are both equal to 0, taking the location needing charging as the candidate fast charging station 2; meanwhile, obtaining the EV location needing charging set C(2) within the service radius SR of the candidate fast charging station 2, and storing the location of the candidate fast charging station 2 and the set C(2) in the fast charging station set CS; And so on in a similar way, determining the location of all candidate fast charging stations;

According to a preset threshold d (the value of d takes 90 in the simulation example), removing the locations of the candidate fast charging stations and the sets thereof within the corresponding service radius SR from the set CS, if the location number of the EV locations needing charging set of the candidate fast charging station is less than the preset threshold d; and determining the remaining candidate fast charging stations in the CS as the fast charging station;

Step 3: According to the spatial and temporal forecast result of the EV charging load and the location of the fast charging station, determining the number of the chargers in each fast charging station by the queuing theory. Wherein, Step 3-1: determining the peak value of EVs arrived at each fast charging station per hour by using the time of each EV needing charging achieved by the Step 1 and the locations of the fast charging stations achieved by the Step 2; setting the peak value as the number $\lambda$, of reaching the fast charging station per hour for EVs;

Step 3-2: Determining the chargers' number of each fast charging station c;

Calculating the average length $L_s$ of waiting queue and the waiting time $W_q$ by the following equations:

$$L_s = L_q + \frac{\lambda}{\mu_2} = \frac{(c\rho)^2 \rho}{c!(1-\rho)^2} P_0 + \frac{\lambda}{\mu_2} \quad (7)$$

$$P_0 = \left[\sum_{k=0}^{c-1} \frac{1}{k!}\left(\frac{\lambda}{\mu_2}\right)^k + \frac{1}{c!}\frac{1}{1-\rho}\left(\frac{\lambda}{\mu_2}\right)^c\right]^{-1} \quad (8)$$

$$\rho = \lambda/(c \times \mu_2) \quad (9)$$

$$W_q = \frac{L_q}{\lambda} \quad (10)$$

Wherein, $\mu_2$ represents the average charged EVs number of a charger per hour; c represents the chargers' number of the fast charging station; the following equation (11) is used as the objective function, and the following equation (12) is used as the constraint condition for solving the optimization, and the chargers' number c can be obtained;

$$\min z = C_s c + C_w L_s \quad (11)$$

$$s.t.\ W_q < t_w \quad (12)$$

In the equations (11) and (12), $C_s$ is the cost per hour, expressed in RMB yuan, converted from per charger by the following equation (13); C), is travel cost per hour, expressed in RMB yuan/vehicle; $t_w$ is the maximum waiting time, expressed in minute.

$$C_s = V_0 \frac{i_r(1+i_r)^p}{(1+i_r)^p - 1} \Big/ 8760 \quad (13)$$

Wherein, $V_0$ is the charger cost in whole life cycle, and the value of which takes 240,000 RMB yuan in the simulation example; $i_r$ is interest rate and the value of which takes 0.1 in the simulation example; p is the charger's service life and the value of which takes 10 in the simulation example.

Simulation Example

The present invention is applied to the traffic network of the round expressway to prove the feasibility and validity of the planning method.

Figure 6:
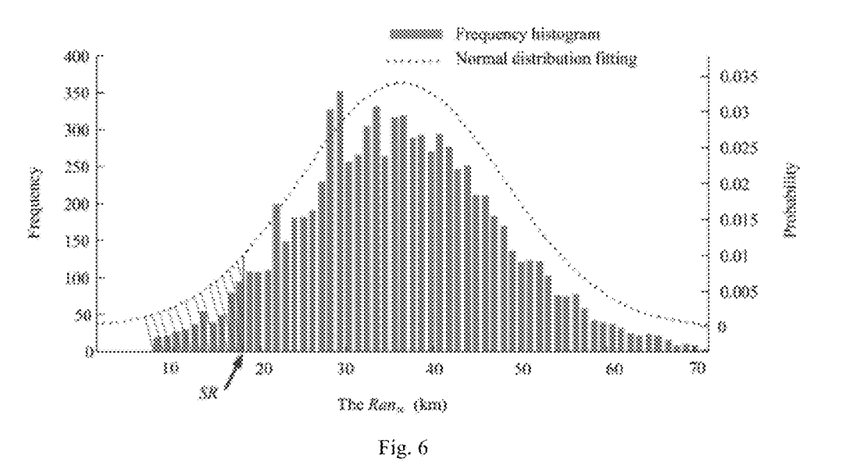
FIG. 6 is the distribution of the maximum travel range $Ran_{sc}$ after the EV needs charging.

Based on the spatial and temporal forecast result of the EV charging load, the travel ranges $Ran_{sc}$ are counted, as shown in FIG. 6, so as to obtain the service radius SR, SR=17.02 km.

Figure 7:
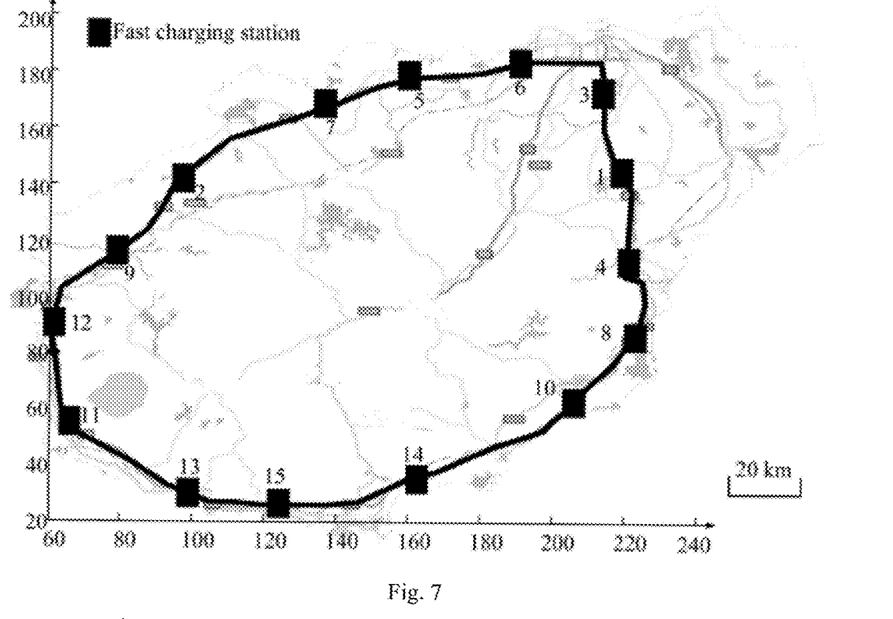
FIG. 7 is the locations of the fast charging stations determined in the Scenario 1 in the present invention.

Scenario 1: The locations of the fast charging station can be obtained by using the shared nearest neighbor clustering algorithm as shown in the FIG. 7.

Figure 8:
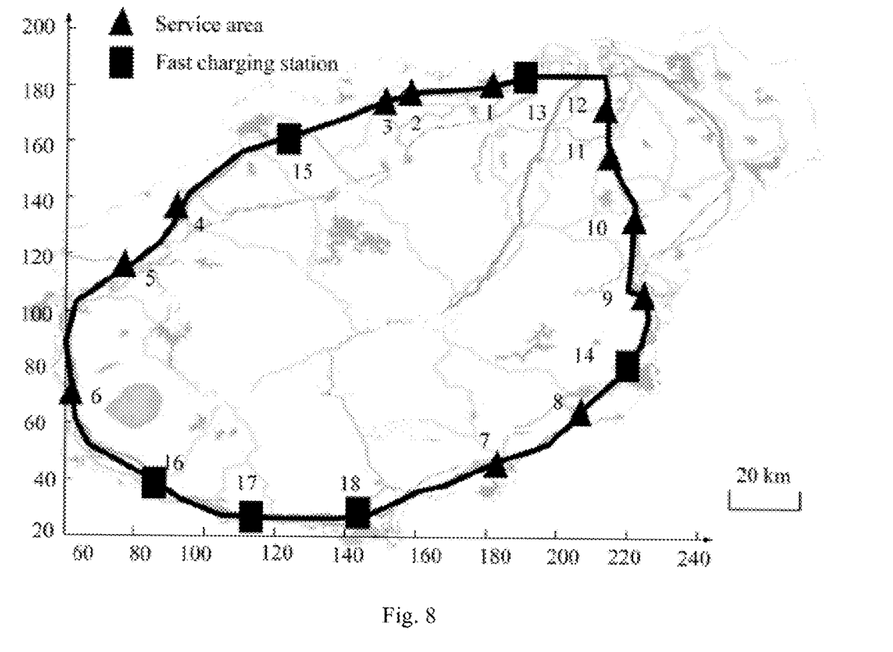
FIG. 8 is the locations of the fast charging stations determined in the Scenario 2 in the present invention.

Scenario 2: The information of the existing service areas of the expressway are shown in the Table 3. If constructing the fast charging stations at the existing service areas is considered a priority, then the locations of the remaining charging stations are determined by using the present invention. The planned fast charge station location distribution is shown in the FIG. 8.

TABLE 3

The distribution of the service areas in the expressway

| No. of the service areas | Coordinate (x, y) | The distance from the entrance & exit 1 (km) |
|---|---|---|
| 1 | (180.3, 180.1) | 564.0 |
| 2 | (156.3, 176.6) | 531.0 |
| 3 | (150.3, 174.6) | 522.0 |
| 4 | (93.0, 136.0) | 444.0 |
| 5 | (78.1, 115.3) | 401. |
| 6 | (62.3, 68.3) | 347.0 |
| 7 | (181.5, 45.6) | 197.0 |
| 8 | (207.1, 64.6) | 150.0 |
| 9 | (223.5, 106.6) | 91.0 |
| 10 | (221.8, 133.2) | 61.0 |
| 11 | (214.0, 160.0) | 28.0 |
| 12 | (214.0, 174.3) | 12.0 |

Based on the spatial and temporal distribution forecast result of the EV charging load and the determined fast charging station locations, the peak values as the number $\lambda$, of reaching each fast charging station per hour for each EV of the Scenario 1 and Scenario 2 are determined as shown in the Table 4 and Table 5.

Then, the chargers' number in each fast charging station of the Scenario 1 and Scenario 2 is obtained by solving the function with the least cost, shown in the Table 6 and 7, respectively.

TABLE 4

The EV number of reaching each fast charging station pear hour of the Scenario 1

| No. of the fast charging station | The EV number $\lambda$ of reaching each fast charging station pear hour |
|---|---|
| 1 | 143 |
| 2 | 113 |
| 3 | 108 |
| 4 | 111 |
| 5 | 105 |
| 6 | 94 |

TABLE 4-continued

The EV number of reaching each fast charging station pear hour of the Scenario 1

| No. of the fast charging station | The EV number λ of reaching each fast charging station pear hour |
|---|---|
| 7 | 98 |
| 8 | 101 |
| 9 | 84 |
| 10 | 73 |
| 11 | 78 |
| 12 | 79 |
| 13 | 81 |
| 14 | 64 |
| 15 | 61 |

TABLE 5

The EV number of reaching each fast charging station pear hour of the Scenario 2

| No. of the fast charging station | The EV number λ of reaching each fast charging station pear hour |
|---|---|
| 1 | 78 |
| 2 | 60 |
| 3 | 71 |
| 4 | 105 |
| 5 | 84 |
| 6 | 82 |
| 7 | 55 |
| 8 | 64 |
| 9 | 103 |
| 10 | 120 |
| 11 | 91 |
| 12 | 84 |
| 13 | 93 |
| 14 | 103 |
| 15 | 97 |
| 16 | 72 |
| 17 | 74 |
| 18 | 72 |

TABLE 6

The capacity result of EV fast charging stations determined by the Scenario 1

| No. of the fast charging station | The chargers' number |
|---|---|
| 1 | 31 |
| 2 | 25 |
| 3 | 24 |
| 4 | 25 |
| 5 | 24 |
| 6 | 22 |
| 7 | 22 |
| 8 | 23 |
| 9 | 19 |
| 10 | 17 |
| 11 | 18 |
| 12 | 18 |
| 13 | 19 |
| 14 | 15 |
| 15 | 14 |

TABLE 7

The capacity result of EV fast charging stations determined by the Scenario 2

| No. of the fast charging station | The chargers' number |
|---|---|
| 1 | 18 |
| 2 | 14 |
| 3 | 17 |
| 4 | 24 |
| 5 | 19 |
| 6 | 19 |
| 7 | 13 |
| 8 | 15 |
| 9 | 23 |
| 10 | 27 |
| 11 | 21 |
| 12 | 19 |
| 13 | 21 |
| 14 | 23 |
| 15 | 22 |
| 16 | 17 |
| 17 | 17 |
| 18 | 17 |

By comparing the planning results, such as number of the charging stations, the chargers' number, the charging failure rate and the total costs, of the Scenario 1 and the Scenario 2 in the Table 8, it is shown that the planning method has a comparative advantage in satisfying the EV demand compared with the maximum interception of traffic flow of the service areas.

TABLE 8

Comparison of the planning results between the Scenario 1 and Scenario 2

| | Scenario 1 | Scenario 2 | Difference |
|---|---|---|---|
| Number of the fast charging stations | 15 | 18 | 3 |
| The chargers' number | 316 | 346 | 30 |
| charging failure rate | 2.46% | 5.56% | 3.1% |
| Total costs (Million RMB yuan/year) | 43.36 | 47.16 | 3.80 |
| Infrastructure costs(Million RMB yuan/year) | 8.03 | 8.79 | 0.76 |
| Waiting time(Million RMB yuan/year) | 35.33 | 38.37 | 3.04 |

The foregoing specific implementations are merely illustrative scenario but not limiting. A person of ordinary skill in the art may make any modifications, equivalent replacements and improvements under the teaching of the present invention without departing from the purpose of the present invention and the protection scope of the appended claims, and all the modifications, equivalent replacements and improvements shall fall into the protection scope of the present invention.

What is claimed is:

1. A method for planning of a plurality of electric vehicle (EV) fast charging stations along an expressway on which a plurality of EVs are travelling, comprising
    Step 1: forecasting a spatial and temporal distribution of EV charging load, which is an estimation of times and locations at which one of the EVs that needs a charging;
    Step 2: based on the estimation of Step 1, determining locations of the EV fast charging stations along the expressway by using a nearest neighbor clustering algorithm, which further comprises:
        Step 2.1: calculating maximum travel range $Ran_{sc}$ per one charging for each EV; and determining, by a normal distribution fitting method, a service radius(SR) of fast charging stations, which is defined as a travel distance which 99% of all the EVs traveling on the expressway can travel with their remaining battery charges;

Step 2.2: determining distance matrix D with a property $d_{ij}$, where $d_{ij}$ represents the distance between charging location $P_i$ where an EV needs charging and a next charging location $P_j$ where the EV also needs charging, i and j are each independently a number of 1~n, and n represents the total number of EVs that need charging;

Step 2.3: based on the distance matrix D, determining similarity matrix S, wherein for each charging location within a service radius SR, a total number of charging locations within that service radius SR is determined; and similarity $s_{ij}$ between charging location $P_i$ and charging location $P_j$ is defined by equation (5);

$$s_{ij}=\text{size}(NN(i) \cap NN(j)) \quad (5)$$

wherein, NN(i) and NN(j) are sets of charging locations within service radius SR of charging locations $P_i$ and $P_j$, respectively; "size" means a number of shared charging locations in an intersection set of NN(i) and NN(j);

Step 2.4: calculating charging demand $l_{1,j}$ of each charging location according to the sum of rows of the similarity matrix S by equation (6);

$$l_{1,j} = \sum_{i}^{n} s_{ij} (1 \le j \le n) \quad (6)$$

Step 2.5: determining locations of the EV fast charging stations, comprising sorting the charging demands from large to small to obtain a charging demand list to obtain a charging location with a largest charge demand, which is set as cluster center number 1, which is a candidate location for fast charging station 1;

obtaining a set of charging locations C(1) within service radius SR of the candidate location of fast charging station 1; and storing the candidate location of fast charging station 1 and the set C(1) into fast charging station set CS; and repeating Step 2.5 with a next charging location of the charge demand list if the next charge location has a "0" similarity $S_{ij}$ with both the candidate location of fast charge station 1 and any charging locations in the set C(1) to obtain a candidate location for fast charging station 2 and corresponding set of charging locations C(2), both the candidate location for fast charging station 2 and C(2) being stored into the charging station set CS, until all charging locations of the charge demand list are processed via Step 2.5;

removing from the set CS any candidate locations for a fast charging station together with its corresponding set of charging locations within its corresponding service radius SR, if the number of charging locations within its corresponding service radius SR is fewer than a preset threshold d; and candidate locations for fast charging stations remaining in the CS are treated as final locations for the EV fast charging stations;

Step 3: according to the forecasting of spatial and temporal distribution of EV charging load as determined in step 1 and the locations of EV fast charging stations as determined in step 2, determining number c of chargers that are needed at each of the EV fast charging stations via a queuing theory.

2. The method according to claim 1, wherein Step 1 further comprising:

Step 1.1: obtaining following basic data:

EV data, which comprise types of the EVs, probability density functions of battery capacity of each of the types, upper and lower boundaries of battery capacity of each of the types, and a mathematical relationship between battery capacity and maximum travel range of each of the types;

Traffic data, which comprise probability matrix $P_{m \times m}$ of traffic origin point and destination point and probability distribution of the time $t_s$ when vehicles entering the expressway; which further comprises:

obtaining traffic origin-destination matrix $A_{m \times m}$ of the expressway's entrance-exits from investigation data of traffic origin and destination points, and obtaining the matrix $P_{m \times m}$ according to equation (1) by using the matrix $A_{m \times m}$;

$$p_{ij}=a_{ij}/B_i (1 \le i \le m, 1 \le j \le m) \quad (1)$$

wherein m is the number of expressway entrance-exits; $a_{ij}$ is a daily average number of EVs passing from an expressway entrance-exit i to another expressway entrance-exit j; $p_{ij}$ is daily probability of a vehicle passing from the expressway entrance-exit i to the expressway entrance-exit j, $B_i$ is an daily average number of vehicle entering the expressway via the expressway entrance-exit i;

$$B_i = \sum_{j=1}^{m} a_{ij} (1 \le i \le m, 1 \le j \le m) \quad (2)$$

which further comprises obtaining basic information about the expressway, including total number of the expressway's entrance-exits, a code assigned for each of the expressway entrance-exits, coordinates of each of the expressway entrance-exits, distances between neighboring expressway entrance-exits;

Step 1.2: determining:

proportion of each type of the EVs on the expressway, daily average number $EB_t$ of EVs entering the expressway, and daily average number $EB_i$ of EVs entering the expressway via entrance-exit i;

based on the value of $EB_t$ and the value of $EB_i$, assigning codes to EVs according to the order of the entrance-exits by which the EVs enter the expressway;

Step 1.3: determining spatial and temporal distribution of charging loads for all EVs entering the expressway, with i being set to 1; which further comprises:

Step 1.3.1: determining $i^{th}$ EV's parameters, including the EV's type, maximum capacity Cap, initial state of charging $SOC_i$, battery state $SOC_c$ when the EV needs charging, travel range $Ran_{ac}$ before the $i^{th}$ EV charges, maximum travel range $Ran_{sc}$ after the EV charges; wherein:

the $i^{th}$ EV's type is determined by a Monte Carlo method;

the maximum capacity Cap of the $i^{th}$ EV is determined by a Monte Carlo method according to the EV type of the $i^{th}$ EV and its probability density function of battery capacity; and setting a value for the state $SOC_i$ and a value for the state $SOC_c$ of the $i^{th}$ EV;

the maximum travel range $Ran_{mc}$ of the $i^{th}$ EV is determined by a Monte Carlo method according to the EV type, the maximum capacity Cap and the mathematical relationship between battery capacity and EV maximum travel range thereof for the $i^{th}$ EV; and with the values for state $SOC_i$, $SOC_c$ and maximum travel range $Ran_{mc}$, the $Ran_{ac}$ of the $i^{th}$ EV is determined by equation (3); and the $Ran_{sc}$ of the $i^{th}$ EV is determined by Equation (4):

$$Ran_{ac} = \eta \times (SOC_i - SOC_c) \times Ran_{mc} \quad (3)$$

$$Ran_{sc} = \eta \times SOC_c \times Ran_{mc} \quad (4)$$

wherein, $\eta$ is an energy efficiency coefficient of battery;

Step 1.3.2: determining traffic parameters of the $i^{th}$ EV, comprising a start point, a destination, a travel path, time $Et_s$ entering the expressway, travel distance $D_{od}$; wherein the start point is determined according to the code of the $i^{th}$ EV; the destination is determined according to the start point and the traffic origin-destination matrix $P_{m \times m}$ by a Monte Carlo method; the travel path is determined based on a shortest path algorithm; the $D_{od}$ is determined based on expressway basic information; and the $Et_s$ is determined by a Monte Carlo method based on probability distribution of the time $i_s$ when the $i^{th}$ EV entered the expressway;

and a value is set for the travel velocity v;

Step 1.3.3: determining whether the travel distance $D_{od}$ of the $i^{th}$ EV is larger than the travel range $Ran_{ac}$; and if $D_{od} > Ran_{ac}$, meaning that the $i^{th}$ EV needs charging, continue to Step 1.3.4; otherwise, no charging is needed for the $i^{th}$ EV, and set i to i+1; and if $i < EB_t$, go back to step 1.3.1; otherwise, continue to Step 2;

Step 1.3.4: determining time $t_c$ and location $P_i$ of the $i^{th}$ EV's next charging, according to the start point, travel path, travel velocity v, $Ran_{ac}$ and the $Et_s$ of the $i^{th}$ EV, and then set i to i+1; if $i < EB_t$, go back to step 1.3.1; otherwise, continue to Step 2.

3. The method according to claim 1, wherein Step 3 further comprises:

Step 3.1: determining peak value $\lambda$ of the EVs, which represents the largest number of EVs arrived at each fast charging station per hour by using the time of each EV needing charging as determined in Step 1 and the locations of fast charging stations as determined in Step 2;

Step 3.2: determining number c, which represents the number of chargers at each fast charging station; which further comprises:

calculating average length $L_s$ of a waiting queue and waiting time $W_q$ by equations (7)-(10):

$$L_s = L_q + \frac{\lambda}{\mu_2} = \frac{(c\rho)^2 \rho}{c!(1-\rho)^2} P_0 + \frac{\lambda}{\mu_2} \quad (7)$$

$$P_0 = \left[ \sum_{k=0}^{c-1} \frac{1}{k!} \left(\frac{\lambda}{\mu_2}\right)^k + \frac{1}{c!} \frac{1}{1-\rho} \left(\frac{\lambda}{\mu_2}\right)^2 \right]^{-1} \quad (8)$$

$$\rho = \lambda / (c \times \mu_2) \quad (9)$$

$$W_q = \frac{L_q}{\lambda} \quad (10)$$

wherein, $\mu_2$ represents an average number of EVs that a charger can charge per hour; c represents the number of chargers at a fast charging station; equation (11) is used as an objective function, and equation (12) is used as a constraint condition for resolving an optimization, which results in a value for number c;

$$\min z = C_s c + C_w L_s \quad (11)$$

$$s.t. \; W_q < t_w \quad (12)$$

wherein, $C_s$ is a cost per hour of each charger, expressed in RMB yuan, obtained by equation (13); $C_w$ is a travel cost per hour per each EV, expressed in RMB yuan; $t_w$ is maximum waiting time, expressed in minute;

$$C_s = V_0 \frac{i_r(1+i_r)^p}{(1+i_r)^p - 1} \Big/ 8760 \quad (13)$$

wherein, $V_0$ is a cost of a charger over its entire service lifespan; $i_r$ is an interest rate; and p is a service lifespan of the charger.

4. The method according to claim 2, wherein Step 3 further comprises:

Step 3.1: determining peak value $\lambda$ of EVs, which represents the largest number of EVs arrived at each fast charging station per hour by using the time of each EV needing charging as determined in Step 1 and the locations of fast charging stations as determined in Step 2;

Step 3.2: determining number c, which represents the number of chargers at each fast charging station; which further comprises:

calculating average length $L_s$ of a waiting queue and waiting time $W_q$ by equations (7)-(10):

$$L_s = L_q + \frac{\lambda}{\mu_2} = \frac{(c\rho)^2 \rho}{c!(1-\rho)^2} P_0 + \frac{\lambda}{\mu_2} \quad (7)$$

$$P_0 = \left[ \sum_{k=0}^{c-1} \frac{1}{k!} \left(\frac{\lambda}{\mu_2}\right)^k + \frac{1}{c!} \frac{1}{1-\rho} \left(\frac{\lambda}{\mu_2}\right)^2 \right]^{-1} \quad (8)$$

$$\rho = \lambda / (c \times \mu_2) \quad (9)$$

$$W_q = \frac{L_q}{\lambda} \quad (10)$$

wherein, $\mu_2$ represents an average number of EVs that a charger can charge per hour; c represents the number of chargers at a fast charging station; equation (11) is used as an objective function, and equation (12) is used as a constraint condition for resolving an optimization, which results in a value for number c;

$$\min z = C_s c + C_w L_s \quad (11)$$

$$s.t. \; W_q < t_w \quad (12)$$

wherein, $C_s$ is a cost per hour of each charger, expressed in RMB yuan, obtained by equation (13); $C_w$ is a travel cost per hour per each EV, expressed in RMB yuan; $t_w$ is maximum waiting time, expressed in minute;

$$C_s = V_0 \frac{i_r(1+i_r)^p}{(1+i_r)^p - 1} \Big/ 8760 \quad (13)$$

wherein, $V_0$ is a cost of a charger over its entire service lifespan; $i_r$ is an interest rate; and p is a service lifespan of the charger.

* * * * *